No. 723,711. PATENTED MAR. 24, 1903.
J. B. McCUTCHEON.
THRESHING MACHINE.
APPLICATION FILED FEB. 3, 1902.
NO MODEL.
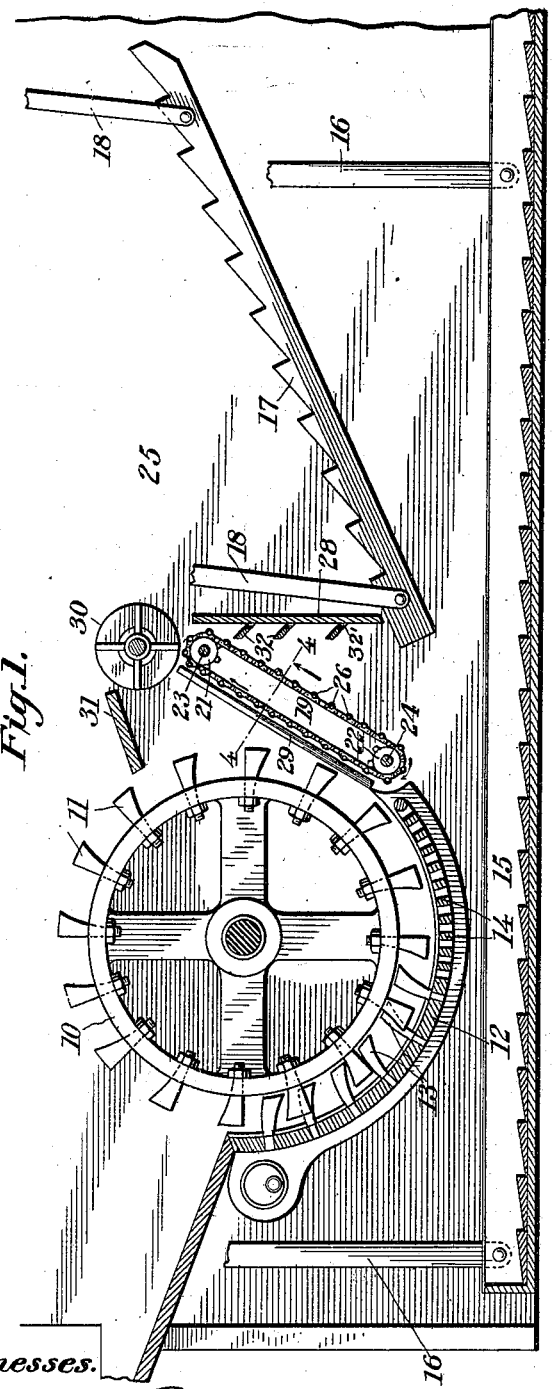
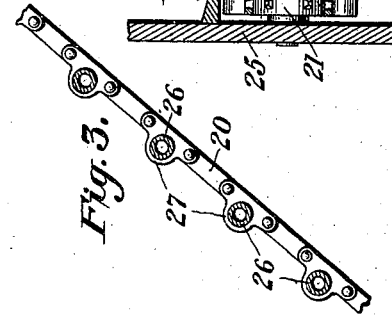
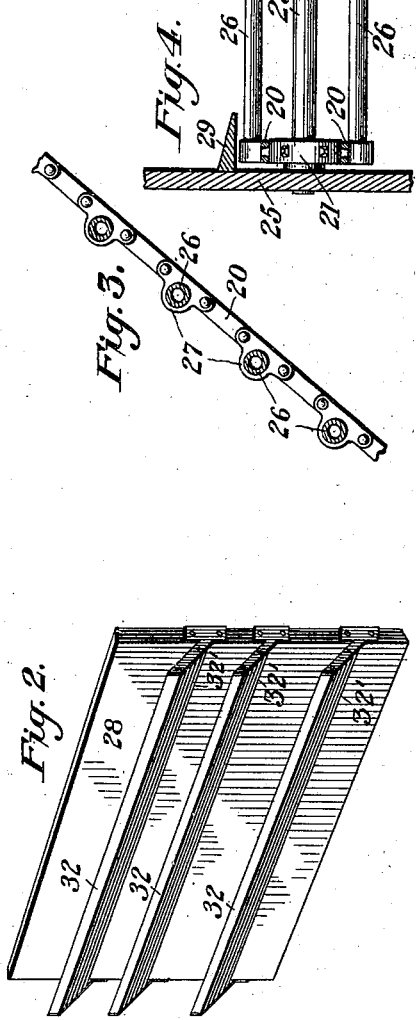
Witnesses.
Inventor:
John B. McCutcheon,
by Rexford M. Smith,
Att'y.

UNITED STATES PATENT OFFICE.

JOHN B. McCUTCHEON, OF BATTLECREEK, MICHIGAN, ASSIGNOR TO NICHOLS & SHEPARD COMPANY, OF BATTLECREEK, MICHIGAN.

THRESHING-MACHINE.

SPECIFICATION forming part of Letters Patent No. 723,711, dated March 24, 1903.

Application filed February 3, 1902. Serial No. 92,389. (No model.)

*To all whom it may concern:*

Be it known that I, JOHN B. MCCUTCHEON, a citizen of the United States, residing at Battlecreek, in the county of Calhoun and State of Michigan, have invented a certain new and useful Threshing-Machine, of which the following is a specification, reference being had therein to the accompanying drawings.

This invention relates to threshing-machines, and particularly to that class of machines in which the straw after being swept over the concave is urged by the cylinder-teeth over an inclined grate and delivered to the straw-carrier and grain-separating mechanism.

The primary object of this invention is to effectually separate a considerable quantity of the kernels from the straw immediately upon the discharge of the material from the concave, and to that extent relieve the remainder of the machine and the mechanism thereof, thus effecting a saving in the power necessary to drive the machine and more thoroughly separating the kernels, straw, and chaff.

In order to attain the desired result, a steeply-inclined traveling endless grate is arranged immediately behind the cylinder and in close proximity to the sweep of the cylinder-teeth, such grate constituting, in effect, an extension of the concave, while behind the grate is located a checking and directing plate which extends downwardly from a line adjacent to the upper end of the grate. The grate deflects and uplifts the straw, but not the flying kernels, the latter passing through the grate and impinging against the checking and directing plate, which intercepts them and causes them to fall into the underlying grain-pan, while the straw is carried upward by the traveling grate and delivered to the separating mechanism. The traveling grate constitutes in itself a straw-carrier and acts to rapidly advance the straw immediately upon its discharge from the concave, thus obviating the tendency for the material to accumulate upon an extended stationary grate and interfere with the continuity and smoothness of operation of the machine.

With the above and other objects in view the invention consists in the novel construction, combination, and arrangement of parts, as hereinafter fully described, illustrated, and claimed.

In the accompanying drawings, Figure 1 is a vertical longitudinal section through a sufficient portion of a threshing-machine to illustrate the application of the present improvement thereto. Fig. 2 is a detail perspective view of a checking and directing plate. Fig. 3 is an enlarged detail section through the forward run of a traveling endless grate. Fig. 4 is a detail cross-section, showing the guard-strips or protectors for the sprocket-chains.

Similar numerals of reference designate corresponding parts in all the figures of the drawings.

The improvements contemplated in this invention are designed with special reference to a cylinder and concave threshing-machine of the ordinary type, in which there is employed a threshing-cylinder 10, provided with the usual cylinder-teeth 11 and operating above and in conjunction with a concave 12, also provided with teeth 13 and having a portion thereof slotted or grated, as shown in 14. Beneath the cylinder and concave is arranged an oscillatory grain-pan 15, swung upon supporting-links 16. Above the grain-pan and in rear of the cylinder and concave I have shown the first and initial straw carrier or shaker section 17 swung upon supporting-links 18, so that it may be oscillated lengthwise.

In carrying out the present invention a traveling endless grate 19 is arranged behind the cylinder 10, as shown in Fig. 1, said endless grate being steeply inclined in close proximity to the sweep of the cylinder-teeth. This traveling endless grate is in the form of an open slotted apron consisting, essentially, of parallel bands connected by cross slats or lags. In order to render the said grate durable, it is preferably composed of a pair of sprocket-chains 20, each of which runs around sprocket-wheels 21 and 22 on shafts 23 and 24, located, respectively, at the top and bottom of the grate, as shown in Fig. 1. It will be understood that each shaft 23 and 24 is provided with two sprocket-wheels, thus providing for a pair of chains which run in parallel relation to each other and at opposite sides of the machine adjacent to the inner surfaces of the sides 25 of the casing or frame of the machine. The chains 20 are connected at intervals by tubular metallic lags 26, each of which has its opposite extremities connected with lugs 27, forming parts of certain links of the chains, as best illustrated in Fig. 3.

The loose grains or kernals which are freed from the straw as it is swept by the cylinder-teeth over the concave impinge against the lags 26 and are directed through the grate, or said grains may pass between the lags without touching them, the kernels in either case passing through the traveling endless grate and being intercepted by the checking and directing plate 28, which is located behind the grate and extends downward from a line adjacent to the upper end of said grate, as shown in Fig. 1.

In order to prevent the grains or kernels from becoming lodged in the sprocket-chains and interfering with the operation of the grate, guard-strips or protectors 29 are arranged to overhang said chains, as illustrated in Figs. 1 and 4. These strips are for convenience supported by and connected with the sides 25 of the casing, extending inward therefrom over the chains 20, as shown in Fig. 4, and having their exposed surfaces inclined or made to slope inward, so that the kernels which impinge against said strips will be directed against or through the grate.

Above the grate 19 is arranged a beater 30 for urging the straw over the top of the grate and upon the adjacent straw carrier or shaker section, while between said beater and cylinder is arranged a guard-board 31, extending transversely across the machine.

The checking and directing plate is provided on its forward face with a series of deflecting-slats 32, pitched at an inclination, so as to deflect the flying kernels and direct the same downward into the grain-pan 15. The inner edges of the slats 32 are set at a sufficient distance from the checking and directing plate to leave spaces 32', which permit the downward escape of grain from the pockets formed by the slats 32 and the directing-plate 28.

From the foregoing description it will be understood that the traveling endless grate intercepts, deflects, and uplifts the straw as it is swept off the concave. The said grate, however, does not intercept the flying kernels, which are permitted to pass through the grate and impinge against the checking and directing plate 28. This plate intercepts the flying kernels, which are thereby directed downward into the grain-pan. Thus at the very outstart a considerable quantity of the kernels is immediately separated from the straw, and to that extent the remainder of the machine and its mechanism is relieved, thereby effecting a saving in the driving and power of the machine and also effecting a more thorough separation between the kernels, straw, and chaff. The traveling endless grate forms, in effect, a moving extension or continuation of the concave, said grate being inclined steeply from the rear end of the concave proper upward in close proximity to the sweep of the cylinder-teeth. Not only does said grate intercept the straw, but it moves the straw upward, and thus avoids any possible accumulation of straw, which when a stationary grate is employed is apt to temporarily clog the machine and interfere with the continuity and smoothness of operation.

I do not wish to be restricted to any special construction of the traveling endless grate, the drawings merely showing the preferred embodiment of that feature of the invention, nor do I desire to be limited to any special form of checking and directing plate, the inclined deflecting-slats, for example, not being essential to the present invention. These and other changes may be resorted to without departing from the principle of this invention.

Having thus described the invention, what I claim as new, and desire to secure by Letters Patent, is—

1. The combination of a toothed cylinder, a concave comprising a concave portion, a stationary grate extension concentric with and forming part of the concave, and a traveling endless grate forming a tangential extension of the concave and stationary grate and steeply inclined in close proximity to the sweep of the cylinder-teeth so that the cylinder and traveling grate coöperate to elevate the straw while said traveling grate permits the flying kernels to pass therethrough, a beater arranged in proximity to the upper portion of the traveling grate, and means behind the grate for checking the flying kernels and directing the same downwardly.

2. The combination of a toothed cylinder, a concave comprising a concave portion, a stationary grate extension concentric with and forming part of the concave, and a traveling endless grate forming a tangential extension of the concave and stationary grate and steeply inclined in close proximity to the sweep of the cylinder-teeth so that the cylinder and traveling grate coöperate to elevate the straw while said traveling grate permits the flying kernels to pass therethrough, and a stationary checking and directing plate extending vertically downward from a line adjacent to the upper edge of said traveling grate.

In testimony whereof I affix my signature in presence of two witnesses.

JOHN B. McCUTCHEON.

Witnesses:
CHESTER P. ALDRICH,
F. O. SMITH.